(12) United States Patent
Zhang et al.

(10) Patent No.: US 12,085,246 B2
(45) Date of Patent: Sep. 10, 2024

(54) VEHICLE HEADLAMP AND VEHICLE

(71) Applicant: HASCO VISION TECHNOLOGY CO., LTD., Shanghai (CN)

(72) Inventors: Dapan Zhang, Shanghai (CN); He Zhu, Shanghai (CN); Zhiping Qiu, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 316 days.

(21) Appl. No.: 17/616,678

(22) PCT Filed: Sep. 5, 2019

(86) PCT No.: PCT/CN2019/104580
§ 371 (c)(1),
(2) Date: Dec. 6, 2021

(87) PCT Pub. No.: WO2020/244079
PCT Pub. Date: Dec. 10, 2020

(65) Prior Publication Data
US 2022/0324376 A1    Oct. 13, 2022

(30) Foreign Application Priority Data

Jun. 5, 2019  (CN) .......................... 201910488336.X
Jun. 5, 2019  (CN) .......................... 201920859938.7
(Continued)

(51) Int. Cl.
*F21S 41/19*    (2018.01)
*B60Q 1/04*    (2006.01)
(Continued)

(52) U.S. Cl.
CPC .......... *F21S 41/192* (2018.01); *B60Q 1/0408* (2013.01); *B60Q 1/0686* (2013.01);
(Continued)

(58) Field of Classification Search
CPC ...... F21S 41/151; F21S 41/153; F21S 41/265; F21S 41/27; F21S 41/275
See application file for complete search history.

(56) References Cited

U.S. PATENT DOCUMENTS 5,614,788 A    3/1997  Mullins et al.
10,228,108 B2 *  3/2019  Courcier ............... F21S 41/143
(Continued)

FOREIGN PATENT DOCUMENTS

CN    1290027       4/2001
CN    203464209 A   3/2014
(Continued)

*Primary Examiner* — Matthew J. Peerce
(74) *Attorney, Agent, or Firm* — IPRTOP LLC (57) ABSTRACT

A vehicle headlamp is provided, where a high beam module includes a primary optical element (2) and a primary light source (3) located on a back side of the primary optical element (2), and light emitted by the primary light source (3) forms a high beam light shape after passing through the primary optical element (2), where the high beam module is further provided with an auxiliary light source (4) beside the primary light source (3), light emitted by the auxiliary light source (4) forms an auxiliary light shape (6) after passing through the primary optical element (2), and when the low beam module is in a light-emitting state, the auxiliary light source (4) is in a light-emitting state. Beneficial effects: in a low beam lighting mode, a high beam part of the vehicle headlamp remains on, which improves the beauty of the overall appearance of the vehicle headlamp. Moreover, because the brightness of the auxiliary light source (4) is very weak, and does not affect the light intensity and uniformity of low beam light shapes (7 and 8) of a vehicle, other nearby vehicles would not be affected, and thus the driving safety of the vehicles would not be affected.

10 Claims, 10 Drawing Sheets

(30) Foreign Application Priority Data

Aug. 8, 2019 (CN) .......................... 201910730411.9
Aug. 22, 2019 (CN) .......................... 201921371967.5

(51) Int. Cl.
*B60Q 1/068* (2006.01)
*B60Q 1/14* (2006.01)
*F21S 41/143* (2018.01)
*F21S 41/153* (2018.01)
*F21S 41/20* (2018.01)
*F21S 41/24* (2018.01)
*F21S 41/29* (2018.01)
*F21S 41/37* (2018.01)
*F21S 41/43* (2018.01)
*F21S 45/47* (2018.01)
*F21W 102/20* (2018.01)
*F21W 107/10* (2018.01)

(52) U.S. Cl.
CPC .......... *B60Q 1/1423* (2013.01); *F21S 41/143* (2018.01); *F21S 41/153* (2018.01); *F21S 41/20* (2018.01); *F21S 41/24* (2018.01); *F21S 41/295* (2018.01); *F21S 41/37* (2018.01); *F21S 41/43* (2018.01); *F21S 45/47* (2018.01); *F21W 2102/20* (2018.01); *F21W 2107/10* (2018.01)

(56) References Cited

U.S. PATENT DOCUMENTS 10,690,307 B2 *   6/2020   Gromfeld ............... F21S 41/24
2015/0131305 A1 *   5/2015   Courcier ............... F21S 41/322
                                                    362/516

FOREIGN PATENT DOCUMENTS

CN          204387890 A     6/2015
CN          109654448 A     4/2019

* cited by examiner

VEHICLE HEADLAMP AND VEHICLE

CROSS REFERENCE TO RELATED APPLICATION

The present application claims the benefit of priority to Chinese Patent Application No. CN 201910488336X, filed with CNIPA on Jun. 5, 2019, No. CN 2019208599387, filed with CNIPA on Jun. 5, 2019, No. CN 2019107304119, filed with CNIPA on Aug. 8, 2019, and No. CN 2019213719675, filed with CNIPA on Aug. 22, 2019, the disclosure of which is incorporated herein by reference in its entirety.

FIELD OF TECHNOLOGY

The present disclosure relates to the field of vehicles, and specifically, to a vehicle headlamp and a vehicle.

BACKGROUND

Currently, a vehicle headlamp includes a high beam module and a low beam module. Correspondingly, there are a high beam lighting mode and a low beam lighting mode. Usually, in the low beam lighting mode, the high beam module is off, which affects the overall appearance of the vehicle headlamp, and consequently affects the beauty of the entire vehicle.

In addition, in the related art, vehicle lamp optical elements generally include a primary optical element and a secondary optical element. The primary optical element and the secondary optical element are spaced apart in a fore-and-aft direction of a vehicle, and are respectively fixedly mounted on a radiator through their respective brackets. As a result, two superimposed mounting errors occur when such vehicle lamp optical elements are mounted, which affects the overall mounting accuracy of the vehicle lamp optical elements, thereby affecting the vehicle lamp light shape.

SUMMARY

In view of the above-mentioned shortcomings of the related art, the technical problem to be resolved by the present disclosure is to provide a vehicle headlamp and a vehicle, which can also emit light from a high beam module in a low beam lighting mode, thereby improving the beauty of the overall appearance of a vehicle headlamp without affecting the lighting effect.

In order to achieve the above objective, the present disclosure provides a vehicle headlamp, including a low beam module and a high beam module, where the high beam module includes a primary optical element and a primary light source located on a back side of the primary optical element, and light emitted by the primary light source forms a high beam light shape after passing through the primary optical element, where the high beam module is further provided with an auxiliary light source beside the primary light source, light emitted by the auxiliary light source forms an auxiliary light shape after passing through the primary optical element, and when the low beam module is in a light-emitting state, the auxiliary light source is in a light-emitting state.

Further, the auxiliary light source is arranged above the primary light source.

Further, the auxiliary light shape formed by the auxiliary light source is located in a low beam light shape region formed by the low beam module.

Further, the auxiliary light source is a light source with adjustable brightness.

Further, the high beam module further includes a primary light source condensing part which is connected to the primary optical element, and light emitted by the primary light source passes through the primary light source condensing part and then is emitted through the primary optical element.

Further, the high beam module further includes an auxiliary light source condensing part which is connected to the primary optical element, and light emitted by the auxiliary light source passes through the auxiliary light source condensing part and then is emitted through the primary optical element.

Further, the auxiliary light source condensing part is an arc-shaped cylindrical body protruding backward, and extends in a left-and-right direction or an up-and-down direction of the primary optical element.

Further, the auxiliary light source condensing part is a spherical cap body protruding backward from a rear end of the primary optical element.

Preferably, a center of the auxiliary light source condensing part is provided with a recessed part, and a bottom portion of the recessed part forms a backward protrusion.

The present disclosure further provides a vehicle, including the above-mentioned vehicle headlamp.

As mentioned above, the vehicle headlamp and the vehicle consistent with the present disclosure have the following beneficial effects:

A primary optical element, a primary light source, and an auxiliary light source are arranged for a high beam module of a vehicle headlamp of a vehicle, therefore when the vehicle headlamp is switched from a high beam lighting mode to a low beam lighting mode, a low beam module is in a light-emitting state, in this case, the auxiliary light source is also in a light-emitting state, the auxiliary light source is a steady on light source, and the brightness of the auxiliary light source is kept relatively low. Therefore, the high beam module still emits light, so that when the vehicle is in the low beam lighting mode, a high beam part of the vehicle headlamp also emits light, which improves the beauty of the overall appearance of the vehicle headlamp. Moreover, the brightness of the auxiliary light source is very weak, and an auxiliary light shape does not affect the light intensity and uniformity of a low beam light shape. Therefore, other nearby vehicles would not be affected, and thus the driving safety of the vehicles would not be affected.

REFERENCE NUMERALS

1 primary light source condensing part
2 primary optical element
2a light emitting surface
3 primary light source
4 auxiliary light source
5 auxiliary light source condensing part
501 protrusion
6 auxiliary light shape
7 low beam light shape upper region
8 low beam light shape lower region

DETAILED DESCRIPTION

The following describes implementations of the present disclosure by using specific embodiments. A person skilled in the art may easily understand other advantages and effects of the present disclosure from the content disclosed in this specification.

It should be noted that the structures, proportions, sizes, and the like shown in the accompanying drawings of the specification, in coordination with the content disclosed in the specification, are only used to help a person skilled in the art to read and understand, and are not intended to limit the conditions under which the present disclosure can be implemented and therefore have no technical significance. Any modifications to the structure, changes to the proportional relationship or the adjustment on the size should fall within the scope of the technical content disclosed by the present disclosure without affecting the effects and the objectives that can be achieved by the present disclosure. Meanwhile, terms such as "above", "below", "left", "right", "middle", and the like in this specification are only used for the clarity of description, and are not intended to limit the implementation scope of the present disclosure. Without substantially changing the technical content, an alteration or adjustment of the relative relationship of such terms shall be construed as falling within the implementation scope of the present disclosure.

Referring to FIG. 1 to FIG. 17, the present disclosure provides a vehicle headlamp, including a low beam module and a high beam module, where the high beam module includes a primary optical element 2 and a primary light source 3 located on a back side of the primary optical element 2, and light emitted by the primary light source 3 forms a high beam light shape after passing through the primary optical element 2, where the high beam module is further provided with an auxiliary light source 4 beside the primary light source 3, light emitted by the auxiliary light source 4 forms an auxiliary light shape 6 after passing through the primary optical element 2, and when the low beam module is in a light-emitting state, the auxiliary light source 4 is in a light-emitting state. The auxiliary light source 4 is preferably a light source with adjustable brightness, and appropriate brightness can be selected as actually needs. In a low beam lighting mode, the low beam module is in a light-emitting state, the auxiliary light source 4 has low brightness, and the brightness of the formed auxiliary light shape 6 is much lower than that of a low beam light shape.

Figure 15:
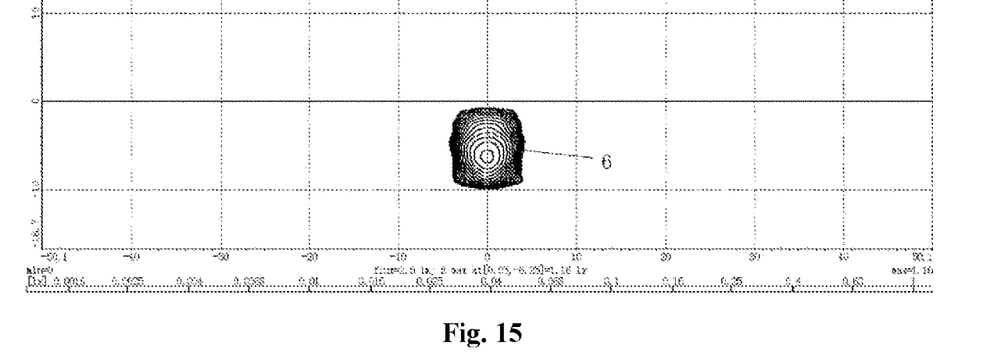
FIG. 15 is a schematic diagram of an auxiliary light shape of an auxiliary light source on a light distribution screen in a fifth embodiment.
Figure 16:
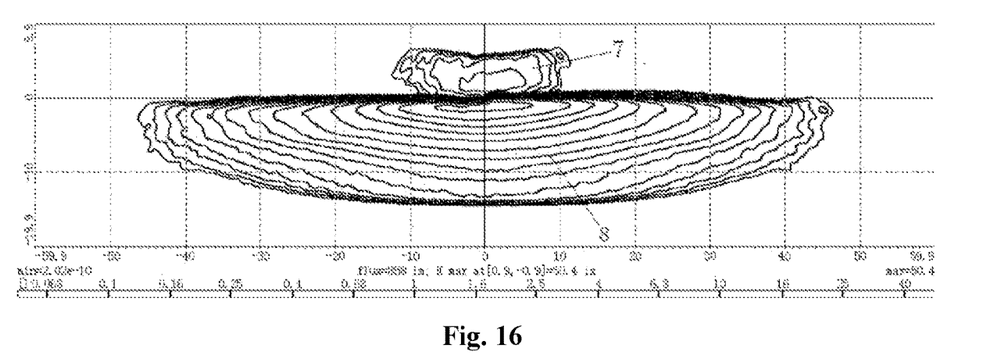
FIG. 16 is a schematic diagram of a low beam light shape formed by a low beam module on a light distribution screen.

The vehicle headlamp consistent with the present disclosure is applied to a vehicle, and has a low beam lighting mode and a high beam lighting mode. FIG. 16 is a schematic diagram of a low beam light shape formed by the low beam module of the vehicle headlamp on a light distribution screen, and the light distribution screen is a vertical screen arranged 25 m in front of the vehicle. The light distribution screen is provided with a reference coordinate axis H (horizontal axis)-axis V (vertical axis). A region of the low beam light shape above the horizontal axis (0-degree line) is recorded as a low beam light shape upper region 7, and a region of the low beam light shape below the horizontal axis (0-degree line) is recorded as a low beam light shape lower region 8. Referring to FIG. 15, in the low beam lighting mode of the vehicle, the auxiliary light source 4 is a steady on light source, and a specific position of the auxiliary light shape 6 formed by the auxiliary light source 4 may be located below the horizontal axis in FIG. 15, and is preferably located just in the low beam light shape lower region 8. Certainly, the auxiliary light shape 6 may alternatively be located in the low beam light shape upper region 7, or in a region outside a low beam light shape region. That is, light emitted by the auxiliary light source 4 through a light emitting surface 2a which is in front of the primary optical element 2 can be emitted to the upper front, the left side, and the right side of the vehicle and other regions that do not affect the low beam lighting. The brightness of the auxiliary light shape 6 is relatively low, and can be specifically determined according to related lighting requirements and the brightness of a high beam light shape and a low beam light shape to ensure that the brightness of the auxiliary light shape 6 would not affect the light intensity and uniformity of the low beam light shape of the vehicle, and would not affect other nearby vehicles either. The primary light source 3 and the auxiliary light source 4 can be arranged on the same circuit board to save material costs.

After the vehicle is switched from the high beam lighting mode to the low beam lighting mode, the high beam module still emits light. Therefore, without affecting the low beam lighting mode of the vehicle, a high beam part of the vehicle headlamp is also on, which improves the beauty of the overall appearance of the vehicle headlamp. Moreover, the brightness of the auxiliary light source 4 is very weak, and would not affect the light intensity and uniformity of a low beam light shape of the vehicle. Therefore, other nearby vehicles would not be affected, and thus the driving safety of the vehicles would not be affected. Certainly, the auxiliary light source 4 can also be kept in a steady on state in the high beam lighting mode of the vehicle, that is, the primary light source 3 and the auxiliary light source 4 in the high beam module emit light at the same time. In this case, the brightness of the auxiliary light source 4 is adjusted to be far lower than that of the primary light source 3, so as not to affect the light intensity and uniformity of the high beam light shape, and not to affect the use effect. In addition, in the high beam lighting mode, the primary light source 3 emits light, in some circumstances, the auxiliary light source 4 can alternatively be adjusted to maintain relatively high brightness according to requirements. For example, in the high beam lighting mode, a luminous flux of the low beam module is affected to some extent, and the brightness is reduced, in this case, the light intensity of the low beam light shape can be appropriately compensated for by adjusting the brightness of the auxiliary light source 4.

Several specific preferable embodiments are given below to further illustrate the high beam module in the vehicle headlamp consistent with the present disclosure.

First Embodiment

Figure 1:
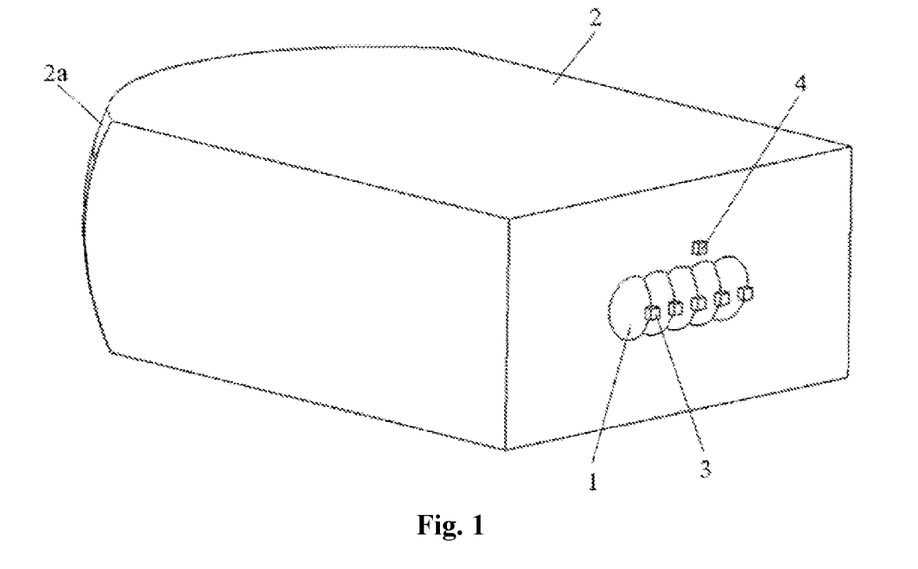
FIG. 1 is a schematic structural diagram of a high beam module according to a first embodiment of the high beam module of the present disclosure.
Figure 2:
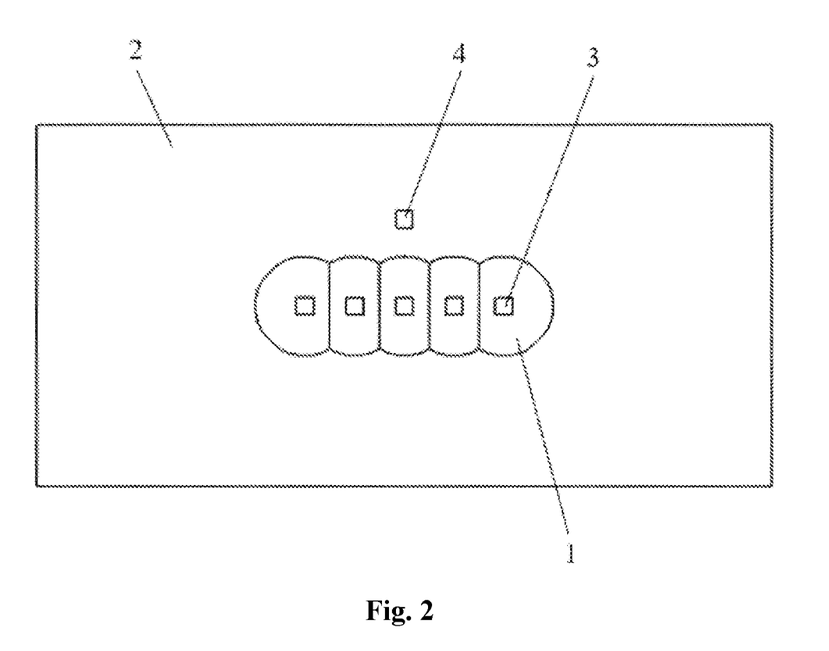
FIG. 2 is a schematic rear view of FIG. 1.

Referring to FIG. 1 and FIG. 2, in this embodiment, a plurality of primary light sources 3 are arranged, and the plurality of primary light sources 3 are arranged in order in a left-and-right direction of the high beam module. Because the auxiliary light source 4 is only used to cause the high beam module to emit light, only one auxiliary light source is arranged. As a preferable design, in this embodiment, the auxiliary light source 4 is arranged above the primary light source 3 to make it convenient for the auxiliary light shape 6 formed by the auxiliary light source 4 to be located in a region below the horizontal axis of the light distribution screen, that is, to make it convenient for the auxiliary light shape 6 to fall into the low beam light shape. Further, preferably, the high beam module further includes a primary light source condensing part 1 which is connected to the primary optical element 2, light emitted by the primary light source 3 passes through the primary light source condensing part 1 for condensing, and then is emitted from the light emitting surface 2a which is in front of the primary optical element 2 after passing through the primary optical element 2, which improves the lighting effect. In this embodiment, preferably, the primary optical element 2 and the primary light source condensing part 1 are integrally connected. Because the primary optical element 2 and the primary light source condensing part 1 are integrally designed to form an integral optical element, the integral optical element can be directly mounted on a radiator through a bracket, and there is only one mounting error, which improves the mounting accuracy. Moreover, because after entering the primary light source condensing part 1, light of the primary light source 3 is always being transmitted in the integral optical element formed by the primary optical element 2 and the primary light source condensing part 1, and finally emitted from the light emitting surface 2a, there is only one Fresnel loss, which increases a luminous flux.

Second Embodiment

Figure 3:
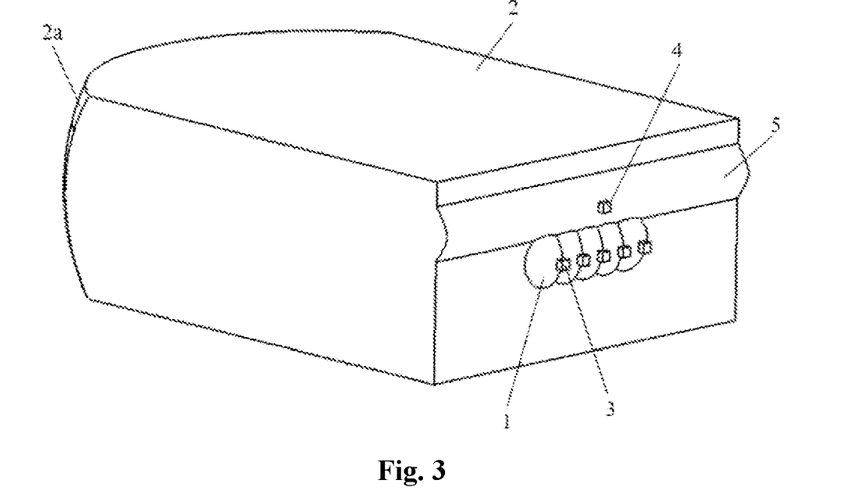
FIG. 3 is a schematic structural diagram of a high beam module according to a second embodiment of the high beam module of the present disclosure.
Figure 4:
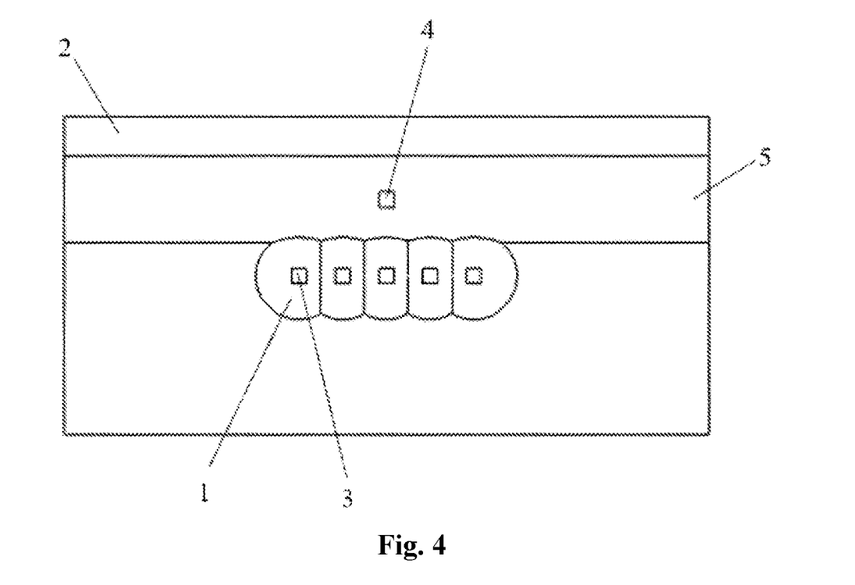
FIG. 4 is a schematic rear view of FIG. 3.

Referring to FIG. 3 and FIG. 4, the high beam module of this embodiment is further improved on the basis of the high beam module of the first embodiment. A difference lies in that the high beam module of this embodiment further includes an auxiliary light source condensing part 5 which is connected to the primary optical element 2, and the auxiliary light source condensing part 5 corresponds to the auxiliary light source 4. Light emitted by the auxiliary light source 4 passes through the auxiliary light source condensing part 5 for condensing, and then is emitted through the light emitting surface 2a that is on a front side of the primary optical element 2. Preferably, in this embodiment, the primary optical element 2 and the auxiliary light source condensing part 5 are also integrally connected, so that light emitted by the auxiliary light source 4 also has only one Fresnel loss, which increases a luminous flux of the auxiliary light source 4. In this embodiment, the auxiliary light source condensing part 5 is an arc-shaped cylindrical body protruding backward and extends in a left-and-right direction of the primary optical element 2. Light emitted by the auxiliary light source 4 is first condensed by the auxiliary light source condensing part 5. Because a longitudinal cross section of the auxiliary light source condensing part 5 is an arc-shaped surface protruding backward, more light emitted by the auxiliary light source 4 enters the primary optical element 2 in an up-and-down direction, thereby enhancing the brightness of the auxiliary light shape 6. The other features in the second embodiment are the same as corresponding features in the first embodiment, and are not repeated herein.

Third Embodiment

Figure 5:
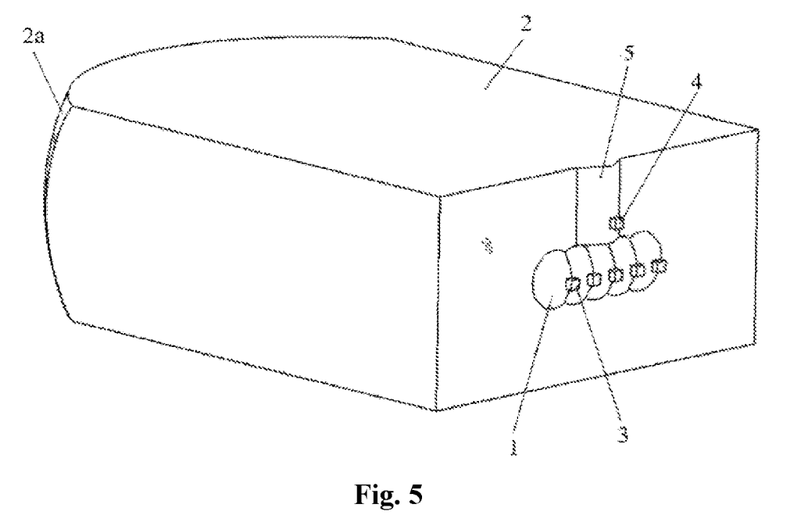
FIG. 5 is a schematic structural diagram of a high beam module according to a third embodiment of the high beam module of the present disclosure.
Figure 6:
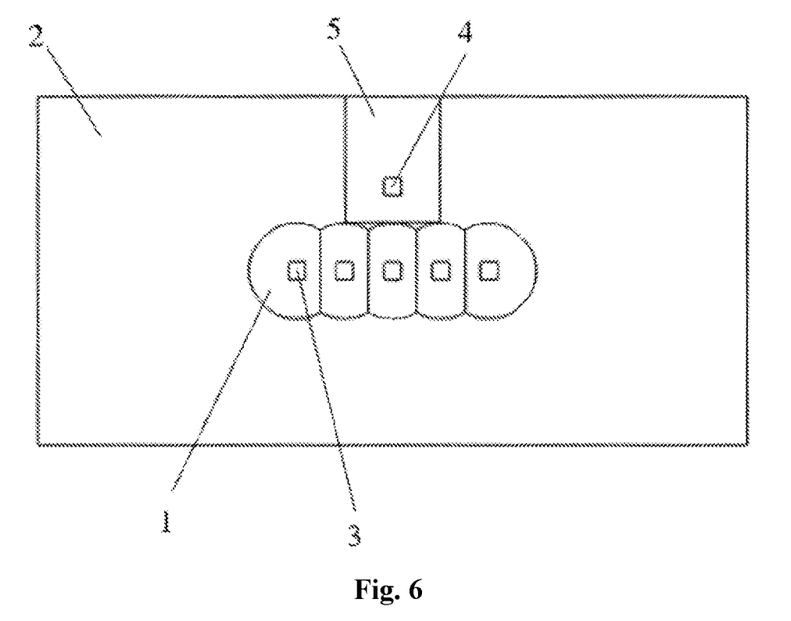
FIG. 6 is a schematic rear view of FIG. 5.
Figure 7:
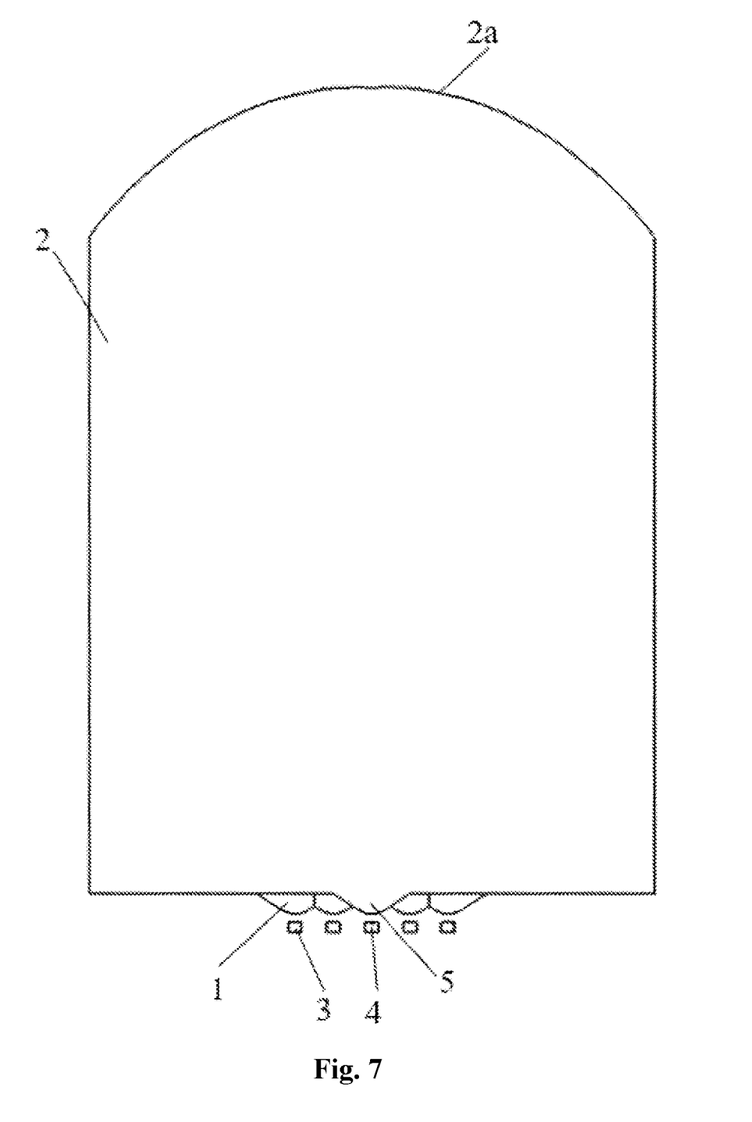
FIG. 7 is a schematic top view of FIG. 5.

Referring to FIG. 5 to FIG. 7, in the high beam module of this embodiment, the auxiliary light source condensing part 5 is an arc-shaped cylindrical body protruding backward. A difference between the high beam module of this embodiment and that of the second embodiment lies in that the auxiliary light source condensing part 5 extends in an up-and-down direction of the primary optical element 2 in the high beam module of this embodiment. Because a transverse cross section of the arc-shaped cylindrical body is an arc-shaped surface protruding backward, light emitted by the auxiliary light source condensing part 5 enters through an arc-shaped cylindrical surface on a back side of the arc-shaped cylindrical body, so that more light emitted by the auxiliary light source 4 enters the primary optical element 2 in a left-and-right direction, thereby enhancing the brightness of the auxiliary light shape 6. The other features in the third embodiment are the same as corresponding features in the second embodiment, and are not repeated herein.

Fourth Embodiment

Figure 8:
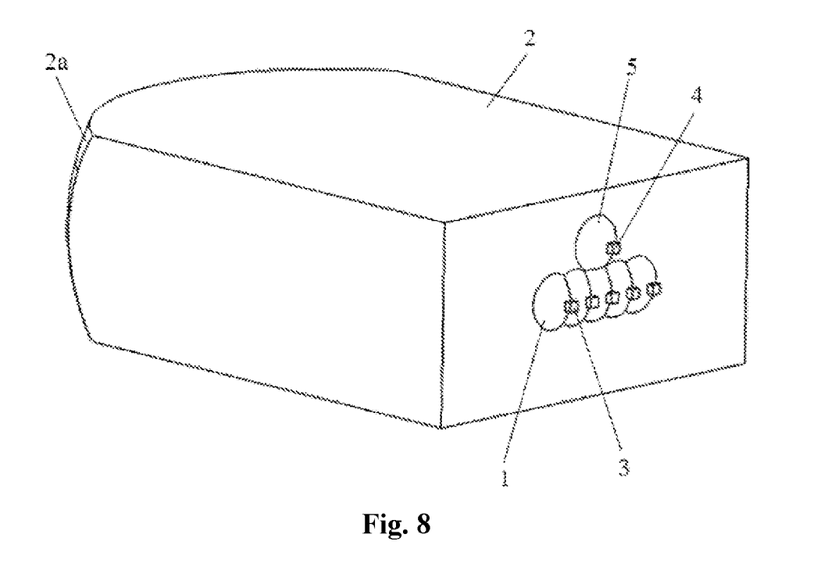
FIG. 8 is a schematic structural diagram of a vehicle high beam module according to a fourth embodiment of the high beam module of the present disclosure.
Figure 9:
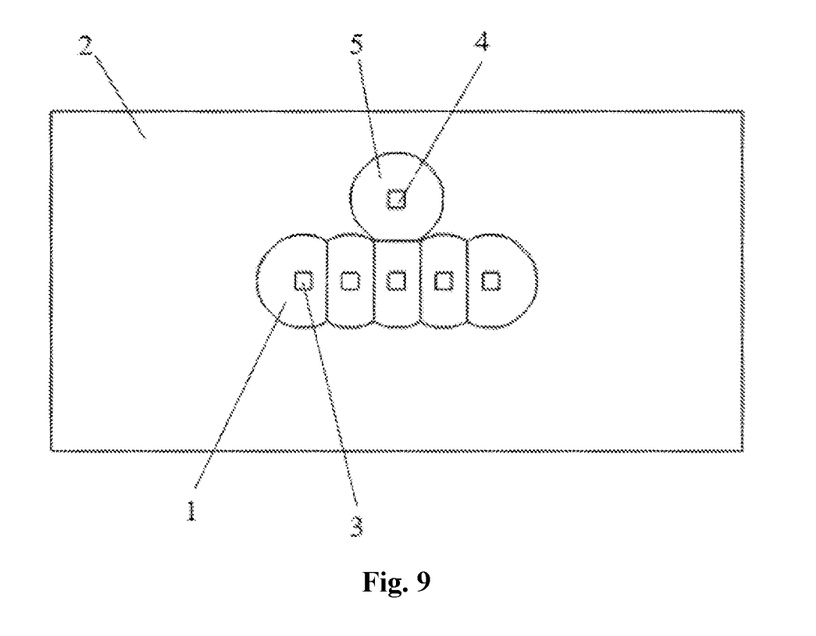
FIG. 9 is a schematic rear view of FIG. 8.
Figure 10:
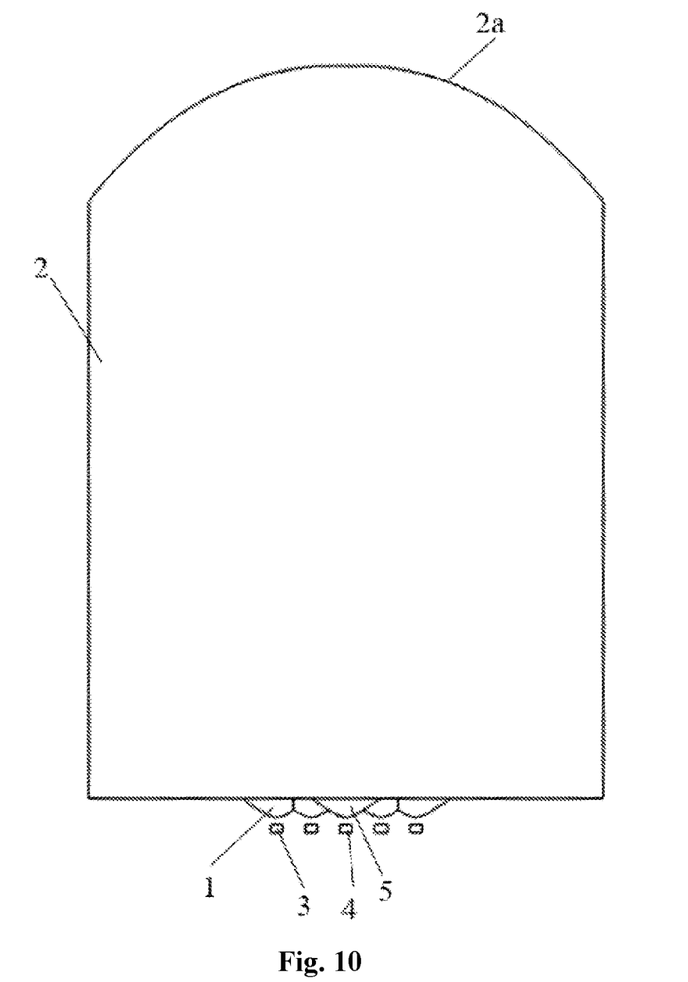
FIG. 10 is a schematic top view of FIG. 8.
Figure 11:
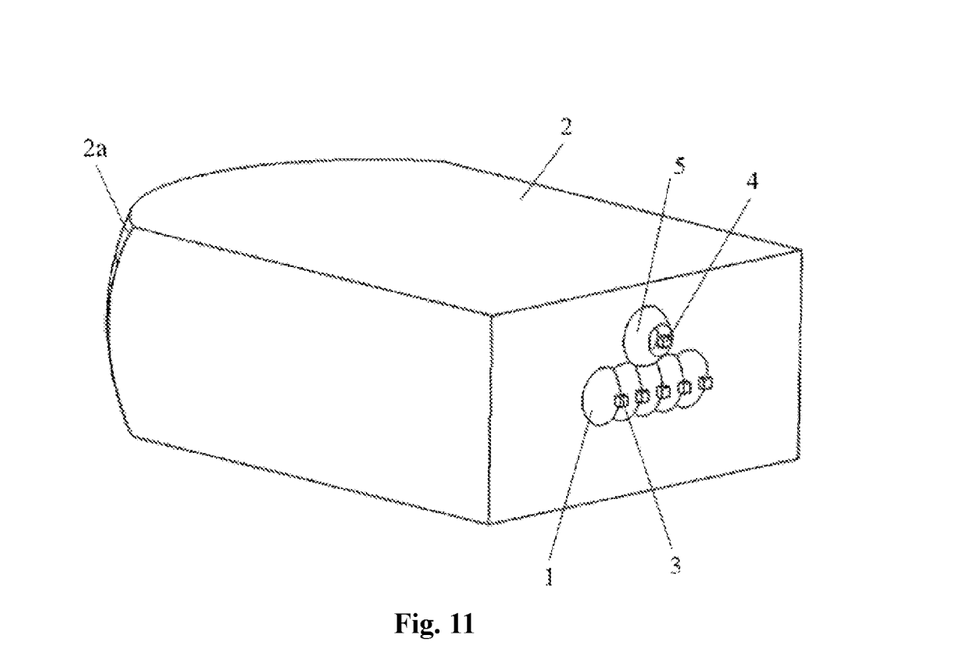
FIG. 11 is a schematic structural diagram of a high beam module according to a fifth embodiment of the high beam module of the present disclosure.
Figure 12:
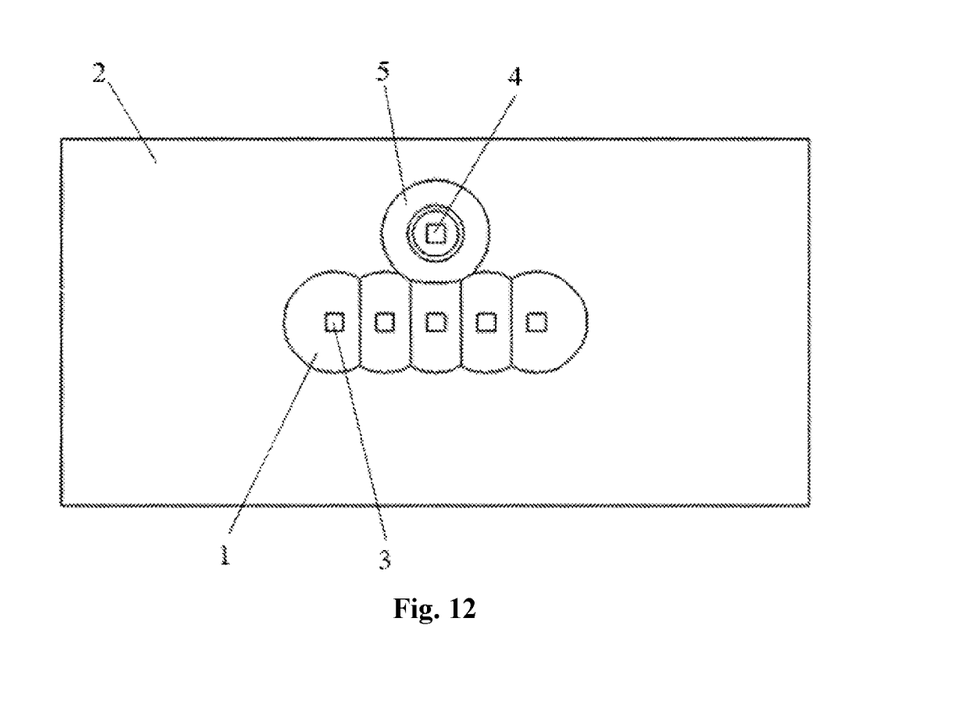
FIG. 12 is a schematic rear view of FIG. 11.
Figure 13:
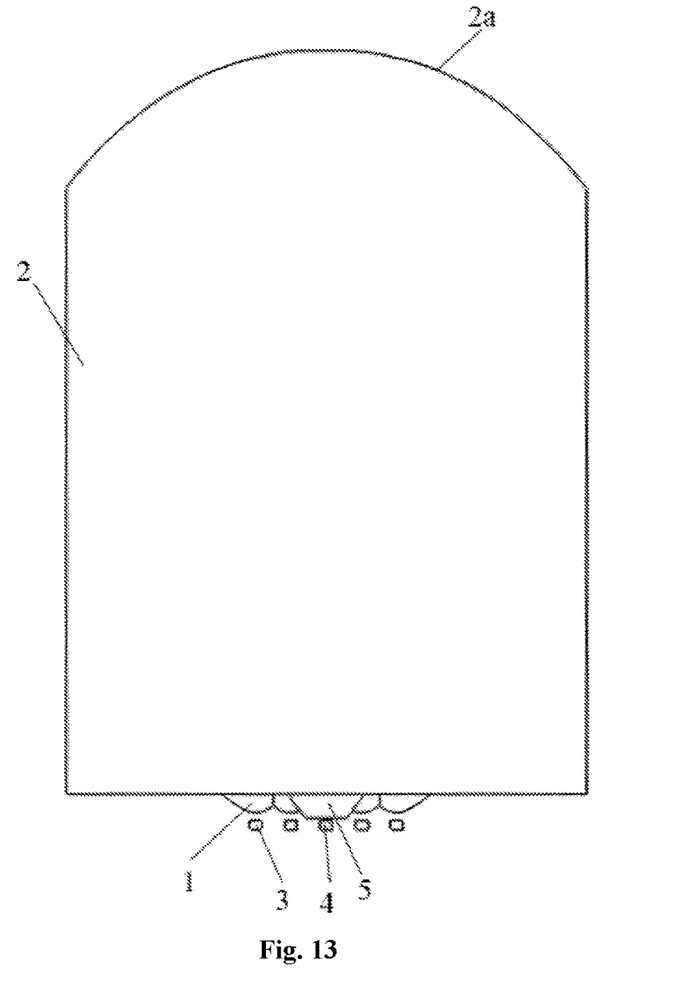
FIG. 13 is a schematic top view of FIG. 11.
Figure 14:
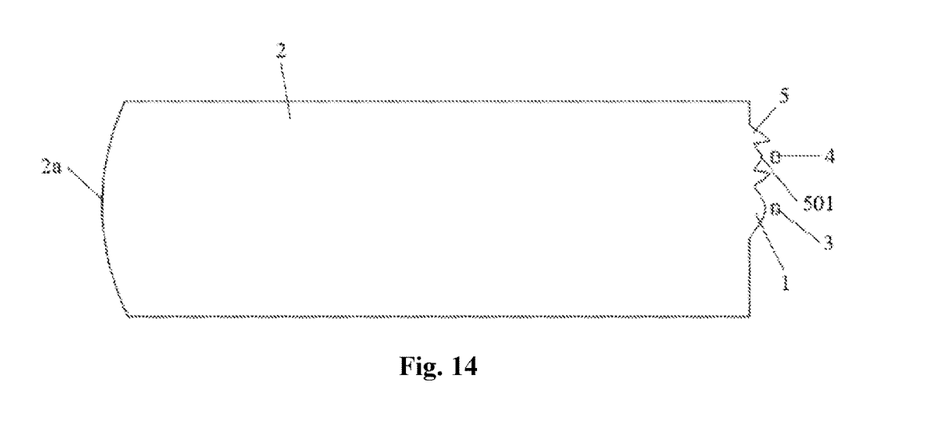
FIG. 14 is a schematic side cross-sectional view of FIG. 11.

Referring to FIG. 8 to FIG. 10, the high beam module of this embodiment is further improved on the basis of the high beam modules of the second embodiment and the third embodiment. A difference lies in that the auxiliary light source condensing part 5 is a spherical cap body protruding backward from a rear end of the primary optical element 2. That is, the spherical cap body has a bottom surface which is connected to the primary optical element 2 and a spherical surface facing backward. Therefore, both a transverse cross section and a longitudinal cross section of the auxiliary light source condensing part 5 are arc-shaped surfaces protruding backward, and light emitted from the auxiliary light source condensing part 5 enters through the spherical surface on a back side of the spherical cap body, so that more light emitted by the auxiliary light source 4 enters the primary optical element 2 in an up-and-down direction and a left-and-right direction. Compared with the second embodiment and the third embodiment, the brightness of the auxiliary light shape 6 formed by the auxiliary light source 4 in this embodiment is higher. The other features in the fourth embodiment are the same as corresponding features in the third embodiment, and are not repeated herein.

Fifth Embodiment

Referring to FIG. 11 to FIG. 14, the high beam module of this embodiment is further improved on the basis of the high beam module of the fourth embodiment. A difference lies in that a center of the auxiliary light source condensing part 5 (spherical cap body) is provided with a recessed part, and a bottom portion of the recessed part forms a backward protrusion 501. That is, the auxiliary light source condensing part 5 has a backward horn-shaped opening, and the protrusion 501 is located in the opening. Compared with the fourth embodiment, a structure of the auxiliary light source condensing part 5 in this embodiment can absorb more light emitted from the auxiliary light source 4, so that the brightness of the auxiliary light shape 6 is higher than that of the auxiliary light shape 6 in each of the previous embodiments. The other features in the fifth embodiment are the same as corresponding features in the fourth embodiment, and are not repeated herein.

Figure 17:
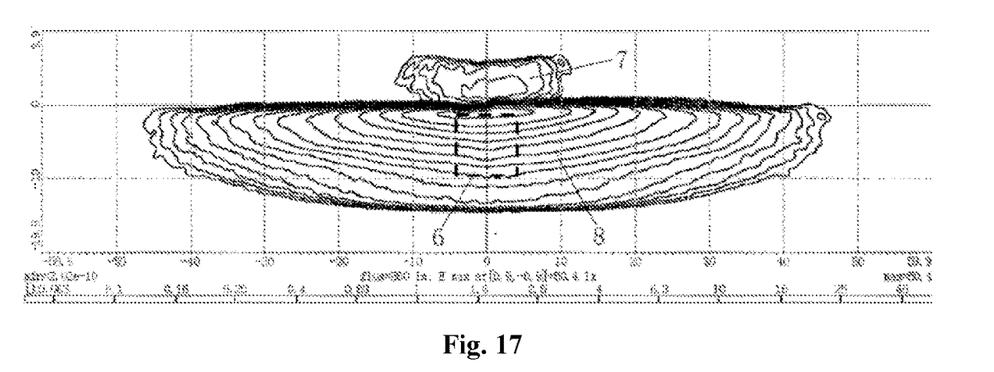
FIG. 17 is a schematic diagram of light shape superimposition of an auxiliary light shape of an auxiliary light source and a low beam light shape on a light distribution screen in a fifth embodiment.
Figure 18:
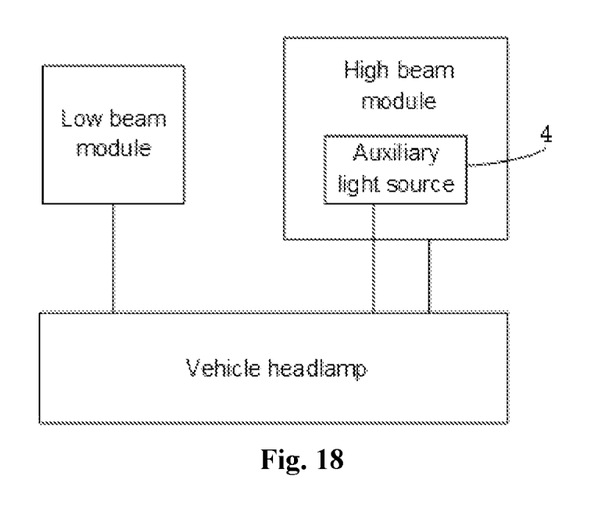

Taking the high beam module of the fifth embodiment as an example, and referring to FIG. 15 to FIG. 17, working conditions of the high beam module are described as follows: FIG. 15 is a schematic diagram of a projection of the auxiliary light shape 6 of the auxiliary light source 4 on the light distribution screen, and FIG. 16 is a schematic diagram of a projection of the low beam light shape on the light distribution screen. FIG. 17 is a schematic diagram of light shape superimposition of the light shapes in FIG. 15 and FIG. 16 on the light distribution screen. A rectangular dashed frame in FIG. 17 represents a range of the region of the auxiliary light shape 6 on the light distribution screen. The auxiliary light shape 6 is located in a range of the low beam light shape lower region 8 that is below the horizontal axis (0-degree line) of the light distribution screen, and can be completely superimposed with the low beam light shape lower region 8. By comparing a luminous flux of the light shape in FIG. 16 and a luminous flux of the light shape in FIG. 17, a difference between the two luminous fluxes is only 2 lm. That is, the intensity of the light emitted by the auxiliary light source 4 is very small, which does not affect the light intensity and uniformity of an original low beam light shape of a vehicle, and does not affect a regulatory test of the low beam light shape either. Therefore, without affecting the low beam lighting mode of the vehicle, the high beam module of the vehicle also emits light, which improves the beauty of the overall appearance of the vehicle headlamp.

The present disclosure further provides a vehicle, including the above-mentioned vehicle headlamp.

It can be seen from the above that the high beam module of the present disclosure has a simple structure and a good working effect. With the auxiliary light source 4, when a vehicle is in the low beam lighting mode, the high beam module also emits light, which ensures the beauty of the overall appearance of the vehicle headlamp, does not affect the intensity and uniformity of the low beam light shape, and does not affect the driving of the vehicle. In addition, by integrating the primary optical element 2, the primary light source condensing part 1, and the auxiliary light source condensing part 5 into one piece, the overall mounting accuracy is high, it can be ensured that an ideal vehicle lamp light shape is formed, and mounting steps are reduced resulting in convenience and quickness.

In summary, the present disclosure effectively overcomes various defects in the prior art and has high industrial value in use.

The above embodiments only exemplarily illustrate the principles and effects of the present disclosure, are not used to limit the present disclosure. Anyone familiar with the art can modify or change the above embodiments without departing from the spirit and scope of the present disclosure. Therefore, all equivalent modifications or changes made by those of ordinary skill in the art without departing from the spirit and technical ideas disclosed in the present disclosure should still be covered by the claims of the present disclosure.

What is claimed is:

1. A vehicle headlamp, comprising a high beam module, wherein
    the high beam module comprises a primary optical element (2) and a primary light source (3) located on a back side of the primary optical element (2), and
    light emitted by the primary light source (3) forms a high beam light shape after passing through the primary optical element (2), wherein
    the high beam module is further provided with an auxiliary light source (4) beside the primary light source (3),
    light emitted by the auxiliary light source (4) forms an auxiliary light shape (6) after passing through the primary optical element (2),
    wherein the high beam module further comprises an auxiliary light source condensing part (5) connected to the primary optical element (2), and
    light emitted by the auxiliary light source (4) passes through the auxiliary light source condensing part (5) and then is emitted through the primary optical element (2);
    wherein the auxiliary light source condensing part (5) is an arc-shaped cylindrical body protruding backward, and extends in an up-and-down direction of the primary optical element (2);
    wherein the vehicle headlamp further comprises a low beam module configured to be in a light-emitting state and to form a low beam light shape when the vehicle headlamp is in a low beam lighting mode;
    wherein the high beam module is configured to be in a light-emitting state and to form the high beam light shape when the vehicle headlamp is in a high beam lighting mode, and to be not in a light-emitting state when the vehicle headlamp is in the low beam lighting mode;
    wherein the auxiliary light source (4) is configured to be in a light-emitting state and to form the auxiliary light shape (6) when the vehicle headlamp is in the low beam lighting mode;
    wherein the auxiliary light shape (6) formed by the auxiliary light source (4) is located in a low beam light shape formed by the low beam module, wherein when the vehicle headlamp is in the low beam lighting mode, a brightness of the formed auxiliary light shape (6) is lower than that of the low beam light shape, so as not to affect the light intensity and uniformity of the low beam light shape.

2. The vehicle headlamp according to claim 1, wherein the auxiliary light source (4) is arranged above the primary light source (3).

3. The vehicle headlamp according to claim 1, wherein the auxiliary light source (4) is a light source with adjustable brightness.

4. The vehicle headlamp according to claim 1, wherein the high beam module further comprises a primary light source condensing part (1) connected to the primary optical element (2), and
    light emitted by the primary light source (3) passes through the primary light source condensing part (1) and then is emitted through the primary optical element (2).

5. A vehicle, comprising the vehicle headlamp according to claim 1.

6. A vehicle headlamp, comprising a low beam module configured to be in a light-emitting state and to form a low beam light shape when the vehicle headlamp is in a low beam lighting mode;

a high beam module, configured to be in a light-emitting state and to form a high beam light shape when the vehicle headlamp is in a high beam lighting mode, and to be not in a light-emitting state when the vehicle headlamp is in the low beam lighting mode, wherein the high beam module comprises a primary optical element (2) and a primary light source (3) located on a back side of the primary optical element (2), and light emitted by the primary light source (3) forms the high beam light shape after passing through the primary optical element (2); and an auxiliary light source (4) disposed beside the primary light source (3) on the high beam module, configured to be in a light-emitting state and to form an auxiliary light shape (6) when the vehicle headlamp is in the low beam lighting mode, wherein light emitted by the auxiliary light source (4) forms the auxiliary light shape (6) after passing through the primary optical element (2), wherein the auxiliary light source (4) is provided with an auxiliary light source condensing part (5) connected to the primary optical element (2), and light emitted by the auxiliary light source (4) passes through the auxiliary light source condensing part (5) and then is emitted through the primary optical element (2);

wherein the auxiliary light source condensing part (5) is a spherical cap body protruding backward from a rear end of the primary optical element (2), wherein a center of the auxiliary light source condensing part (5) is provided with a recessed part, and a bottom portion of the recessed part forms a backward protrusion (501);

wherein the auxiliary light shape (6) formed by the auxiliary light source (4) is located in the low beam light shape formed by the low beam module, wherein a difference between a luminous flux of the low beam light shape and that of the auxiliary light shape (6) is 2 lm.

7. The vehicle headlamp according to claim 6, wherein the auxiliary light source (4) is arranged above the primary light source (3).

8. The vehicle headlamp according to claim 6, wherein the auxiliary light source (4) is a light source with adjustable brightness.

9. The vehicle headlamp according to claim 6, wherein the high beam module further comprises a primary light source condensing part (1) connected to the primary optical element (2), and light emitted by the primary light source (3) passes through the primary light source condensing part (1) and then is emitted through the primary optical element (2).

10. A vehicle, comprising the vehicle headlamp according to claim 6.

* * * * *